United States Patent
Juarez et al.

(10) Patent No.: US 7,840,465 B1
(45) Date of Patent: Nov. 23, 2010

(54) SYSTEMS AND METHODS FOR CONDUCTING REAL-TIME APPLICATION OF ELECTRONIC PAYMENTS

(75) Inventors: Maximiliano C. Juarez, Helotes, TX (US); Paul Oncale, III, Cibolo, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 12/105,385

(22) Filed: Apr. 18, 2008

(51) Int. Cl.
*G06Q 40/10* (2006.01)
(52) U.S. Cl. ...................................... 705/35
(58) Field of Classification Search ............... 705/35
See application file for complete search history.

(56) References Cited

U.S. PATENT DOCUMENTS

| | | | |
|---|---|---|---|
| 5,920,847 | A | 7/1999 | Kolling et al. |
| 7,333,953 | B1 * | 2/2008 | Banaugh et al. ............. 705/40 |
| 7,587,363 | B2 | 9/2009 | Cataline et al. |
| 2002/0038289 | A1 | 3/2002 | Lawlor et al. |
| 2003/0229590 | A1 | 12/2003 | Byrne et al. |
| 2004/0049456 | A1 | 3/2004 | Dreyer |
| 2004/0064386 | A1 * | 4/2004 | Goguen et al. ............ 705/34 |
| 2004/0236688 | A1 | 11/2004 | Bozeman |
| 2005/0125342 | A1 | 6/2005 | Schiff |
| 2005/0177510 | A1 * | 8/2005 | Hilt et al. .................... 705/40 |
| 2006/0146839 | A1 | 7/2006 | Hurwitz et al. |
| 2007/0011014 | A1 | 1/2007 | Umapathy |
| 2007/0100749 | A1 | 5/2007 | Bachu et al. |

OTHER PUBLICATIONS

No Author, Verizon wireless Customers now have the freedom to make walk in payments and add minutes at checkfree pay locations nationwide; customers can conduct cash transactions at over 11,000 authorized agents. PR Newswire New York May 30, 2007 p. 1.*

"CheckFree Announces Agreement to Provide Real Time Reconciliation for Cable & Wireless Real Time Nostro Data Feed." Oct. 11, 2004 [Retrieved on Nov. 13, 2007], Retrieved from the internet <URL: http://www.prnewswire.com/cgi-bin/stories.pl?ACCT=104&STORY=/www/story/10-11-2004/0002271950&EDATE=>.

"VisionRisk : Account Reconciliation- An automated account reconciliation solution" [Retrieved on Nov. 13, 2007], Retrieved from the internet <URL: http://www.metavanteimage.com/Storage/marketing/Vision/Risk-Reconciliation_slick.pdf>.

* cited by examiner

*Primary Examiner*—James Trammell
*Assistant Examiner*—Abdul Basit
(74) *Attorney, Agent, or Firm*—Perkins Coie LLP

(57) ABSTRACT

An organization electronically receives a payment from a customer of the organization based on a current time. If the current time is before a predetermined time relating to an identified payment due date, a non-real-time payment system is employed to effectuate the payment from the customer. The non-real-time payment system processes the payment at a later time on or before the identified payment due date such that the payment is applied to the customer on or before the identified payment due date. If the current time is after a predetermined time relating to the identified payment due date, a real-time payment system is employed to effectuate the payment from the customer. The real-time payment system processes the payment at the current time such that the payment is applied to the customer at the current time.

21 Claims, 3 Drawing Sheets

SYSTEMS AND METHODS FOR CONDUCTING REAL-TIME APPLICATION OF ELECTRONIC PAYMENTS

CROSS-REFERENCE TO RELATED APPLICATION(S)

The present application is filed concurrently with and shares a common title and disclosure with the following applications, each of which is hereby incorporated herein by reference in its entirety:

U.S. patent application Ser. No. 12/105,378; and
U.S. patent application Ser. No. 12/105,402.

FIELD

The present disclosure is directed to systems and methods that apply electronic payments in real-time or near-real-time. More particularly, the present disclosure is directed to such systems and methods that electronically apply credit account payments such as credit card payments in such real-time or near-real-time.

BACKGROUND

In a highly automated operation such as may be employed by a large organization, payments for amounts owed to the organization from customers thereof may commonly be received electronically. Typically, then, the organization operates a payment site on an inter-network system such as the Internet, and a particular customer electronically visits the payment site to effectuate an electronic payment transaction for an amount owed by such customer to such organization. Typically, although not necessarily, such electronic payment transaction by the particular customer includes an electronic credit of funds to the organization and a corresponding electronic debit of the funds from an account of the particular customer. The account of the particular customer may be an identified bank account of the customer, an identified credit account of the customer, or the like.

Notably, such an electronic payment transaction is not a real-time or near-real-time (hereinafter, 'real-time') transaction inasmuch as the electronic debit of the funds from the account of the customer does not take place during such transaction. Instead, and typically, the electronic transaction creates a batch item requesting the electronic debit of the funds, where the batch item is aggregated with other batch items requesting electronic debits of funds from other customers into a batch, and where the batch with the batch items is not processed until a later time. For example, all batch items created up until a cut-off time such as 12 NOON local time for a particular day may be aggregated into a batch that is processed at a process time such as 9 PM local time that day.

As should be appreciated, an electronic payment transaction performed by a customer is not actually applied to the customer until the process time at which the corresponding batch item is processed. Thus, an electronic payment transaction performed by a customer before 12 NOON on a particular day according to the above example would be processed and applied to the customer that particular day. However, an electronic payment transaction performed by the customer after 12 NOON on that particular day according to the above example would be processed and applied to the customer the next day.

In the latter case, where the transaction is performed after the cut-off time, a problem arises for the customer if the payment is due that particular day. In such a circumstance, although the electronic payment transaction is performed on the day that the payment is due, the corresponding batch item is aggregated into a batch that is processed the next day. As a result, the payment is applied to the customer that next day, which is the day after the payment was due, with the result being that the applied payment is considered by the organization to be late.

As should be understood, such a late payment may result in the customer being assessed a late fee and/or other late charges. Perhaps understandably, the customer is unhappy with the payment being considered late, especially inasmuch as the transaction was performed before the end of the payment due date, and may complain to the organization. As a result, the customer may view the organization harshly, and perhaps conduct future business elsewhere. Of course, the organization may attempt to placate the unhappy customer by manually removing the late fees and/or other charges, but doing so usually requires a manual transaction with corresponding costs in time and effort to both the customer and the organization.

Accordingly, a need exists for systems and methods that allow the organization to conduct real-time application of electronic payments from customers so that funds from a payment transaction with a customer are applied to the customer on the date of the payment transaction. More particularly, a need exists for such systems and methods that allow the organization to conduct both real-time application of an electronic payment from a customer who is conducting a payment transaction on the day payment is due, and also non-real-time application of an electronic payment from a customer who is conducting a payment transaction prior to the day payment is due.

SUMMARY

The aforementioned needs are satisfied at least in part by a system and method employed by an organization to electronically receive a payment from a customer of the organization. The organization operates a networked electronic payment site at which the customer is received and identified, and an amount due as a payment from the identified customer is identified, as is a payment due date for the payment. The identified customer at the electronic payment site provides an identification of an account of the customer from which funds for the payment are to be debited.

A current time is determined. If the determined current time is before a predetermined time relating to the identified payment due date, a non-real-time payment system is employed to effectuate the payment from the customer. The non-real-time payment system processes the payment at a later time on or before the identified payment due date such that the payment is applied to the customer on or before the identified payment due date. If the determined current time is after a predetermined time relating to the identified payment due date, a real-time payment system is employed to effectuate the payment from the customer. The real-time payment system processes the payment at the current time such that the payment is applied to the customer at the current time.

The real-time payment system may request electronic debiting of the funds for the payment from the identified account of the customer on a real-time basis by way of an intermediary service. Thereafter, the real-time payment system receives an acknowledgment from the intermediary service based on the request that the debiting will be performed. Upon receiving the acknowledgment, the real-time payment system credits the funds such that the payment is applied to the customer at the current time.

BRIEF DESCRIPTION OF THE DRAWINGS

The foregoing summary, as well as the following detailed description of various embodiments of the present innovation, will be better understood when read in conjunction with the appended drawings. For the purpose of illustrating the embodiments, there are shown in the drawings embodiments which are presently envisioned. As should be understood, however, the embodiments of the present innovation are not limited to the precise arrangements and instrumentalities shown. In the drawings.

DETAILED DESCRIPTION

Example Computing Environment

Figure 1:
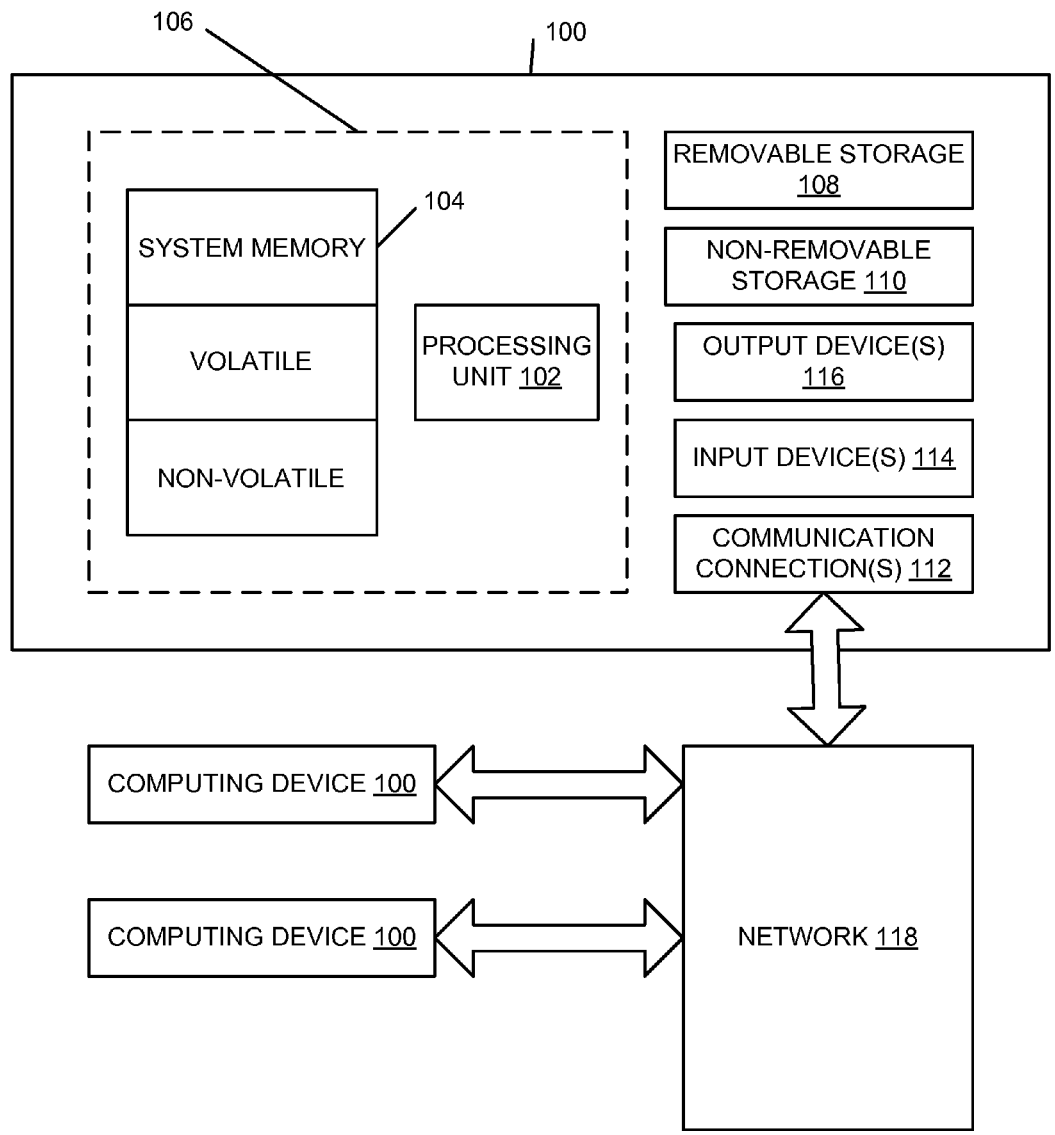
FIG. 1 is a block diagram of an example of a computing environment within which various embodiments of the present innovation may be implemented.

FIG. 1 is set forth herein as an exemplary computing environment in which various embodiments of the present innovation may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features/functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes or is provided with a variety of computer-readable media. Computer readable media can be any available media that can be accessed by computing device 100 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 may also contain communications connection(s) 112 that allow the device to communicate with other devices. Each such communications connection 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Receiving and Applying Electronic Payments in Real-Time

Figure 2:
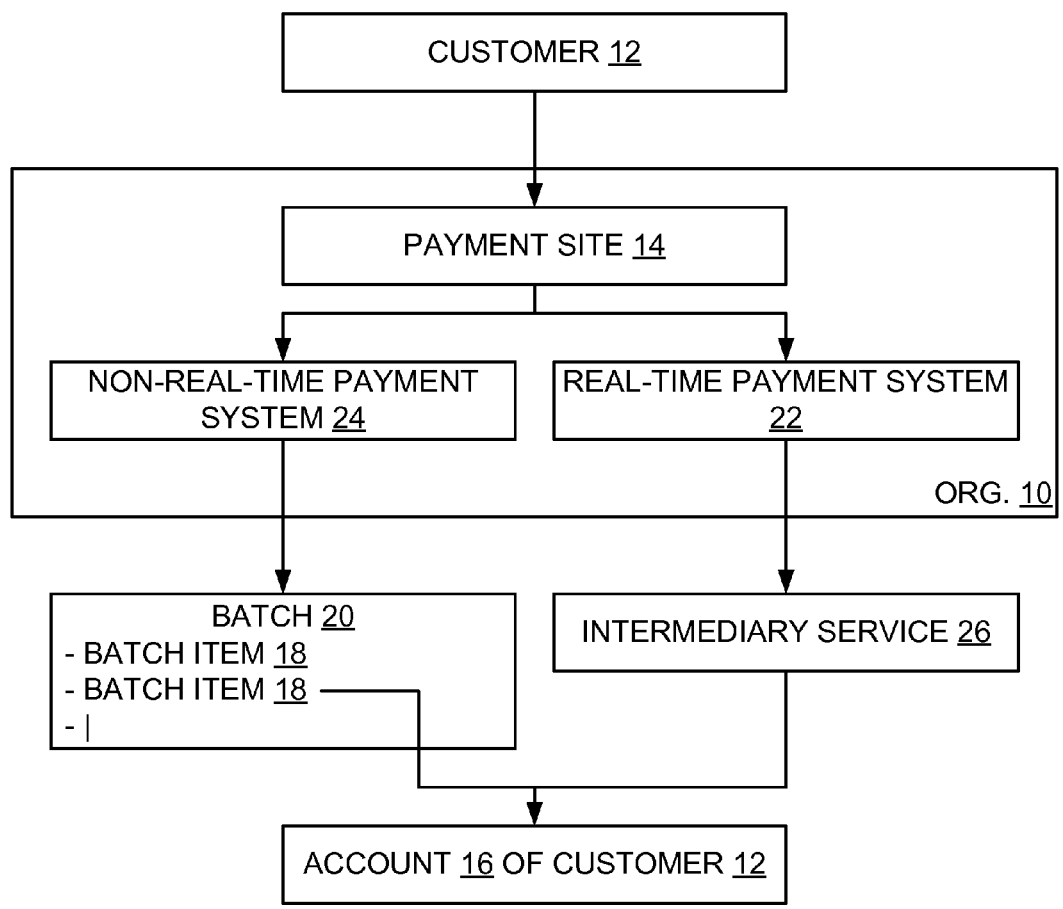
FIG. 2 is a block diagram of a system for performing non-real-time application of electronic payments to a customer in accordance with the prior art, and also a system for performing real-time application of electronic payments to a customer in accordance with various embodiments of the present innovation.

Turning now to FIG. 2, it is seen that a particular organization 10 employs an automated operation to receive electronic payments for amounts owed to the organization 10 from customers 12 thereof. Note here that the organization 10 and customer 12 may be most any appropriate organization and customer without departing from the spirit and scope of the present innovation. For example, the organization 10 may be a utility such as an electric company, a retailer such as a department store, a creditor providing credit accounts, a loan servicing center accepting payments for loans, a membership club accepting payments from members, and the like. Likewise, the customer 12 may be any entity that could perform an electronic payment, such as an individual, another organization 10, a fictional person, and the like.

Typically, and as seen, the organization 10 operates a payment site 14 on an inter-network system such as the Internet, and a particular customer 12 electronically visits the payment site 14 to effectuate an electronic payment transaction for an amount owed by such customer 12 to such organization 10. Thus, the customer 12 may be making a monthly credit card payment to a credit card issuing organization 10, paying a utility bill to a utility providing organization, etc. As was alluded to above, the electronic payment transaction for the customer 12 includes an electronic credit of funds to the organization 10 based on a corresponding electronic debit of the funds from an account 16 of the customer 12.

The account 16 may be most any account from which funds may be electronically supplied, such as an identified bank account 16 of the customer 12 or an identified credit account 16 of the customer 12. Presumptively, then, the electronic payment transaction performed by the customer 12 at the site 14 includes the identification of the account 16 thereof from which the funds for the payment are to be electronically debited. The transaction likely need not also include an identification of an account of the organization 10 to which the funds for the payment are to be electronically credited, at least as far as the customer 12 is concerned.

Also presumptively, the organization 10 can identify based on the customer 12 an amount due from such customer 12 as payment. Typically, such identifying is performed by accessing a database (not shown) of the organization 10 having such information. Note here that such a database may identify a number of amounts due, perhaps based on different lines of business of the organization, or based on different types of payment, such as for example full payment, minimum payment, etc. Alternately, if the organization 10 cannot identify based on the customer 12 an amount due therefrom as payment, the customer 12 may be requested to manually enter such payment without departing from the spirit and scope of the present invention.

The electronic payment transaction as was performed in the prior art is not a real-time or near-real-time (hereinafter, 'real-time') transaction inasmuch as the electronic debit of the funds from the account 16 of the customer 12 did not take place during such transaction. Instead, and as was set forth above, the prior art electronic transaction creates a batch item 18 requesting the electronic debit of the funds from the account 16 of the customer 12, where the batch item 18 is aggregated with other batch items 18 requesting electronic debits of funds from accounts 16 of other customers 12 into a batch 20, and where the batch 20 with the batch items 18 is processed at a later time. Typically, such a batch 20 contains batch items 18 created up until a cut-off time such as 12 NOON local time for a particular day, and is processed at a process time such as 9 PM local time that day.

As was set forth above, then, a prior art electronic payment transaction as performed by a customer 12 is not actually applied to the customer 12 until the process time at which the corresponding batch item is processed. Thus, an electronic payment transaction performed by a customer 12 at 11 AM on a particular day according to the above example would be processed that particular day at 9 PM and applied to the customer 12 that particular day. However, an electronic payment transaction performed by the customer 12 at 1 PM on that particular day according to the above example would miss the cut-off time for the batch 20 for that particular day. Instead, the batch item 18 created by the 1 PM transaction would be processed in the batch 20 with the cut-off time of 12 NOON the next day, would be processed the next day at 9 PM, and would thus be applied to the customer 12 the next day.

In the prior art transaction performed after the cut-off time, then, if the payment is due that particular day, the payment will be considered as being late. In particular, although the prior art electronic payment transaction is performed on the day that the payment is due, the corresponding batch item 18 is aggregated into a batch 20 that is processed the next day because the transaction was after the cut-off time for the particular day. As a result, and again, the payment is applied to the customer 12 that next day, which is the day after the payment was due, with the result being that the applied payment is considered by the organization to be late. As should be understood, depending on the organization 10, such a late payment may result in the customer 12 being assessed a late fee and/or other late charges. Even though the transaction was performed by the customer 12 on the particular day that the payment was due, the payment was still considered to be late because the transaction missed the cut-off time for the batch 20 that processed and applied that particular day.

Of course, the customer 12 is likely unhappy with the payment being considered late, especially inasmuch as the transaction was performed before the end of the payment due date. The customer 12 may therefore complain to the organization 10 and even have the organization manually removing the late fees and/or other charges by way of a manual transaction. However, both the customer 12 and the organization 10 are inconvenienced and experience corresponding costs in time and effort. Moreover, the customer 12 is left with a bad experience that reflects poorly on the organization 10 and causes the customer 12 to accumulate an amount of ill will against the organization.

As should be appreciated, it would be better if the organization 10 could avoid the situation where a customer 12 performs an electronic payment transaction to effectuate a payment to the organization 10 on a particular day that the payment is due, but the payment is not applied to the customer 12 on the particular day. Instead, it would be better if the customer 12 performs the electronic payment transaction to effectuate the payment to the organization 10 on the particular day that the payment is due, and the payment is applied to the customer 12 on the particular day regardless of the time of day that the transaction is performed.

Accordingly, and in various embodiments of the present innovation, the organization 10 employs a real-time payment system 22 that allows the customer 12 performing the electronic payment transaction to effectuate the payment to the organization 10 on the particular day that the payment is due, and that applies the payment to the customer 12 on the particular day on a real-time basis and regardless of the time of day that the transaction is performed. More generally, such a system 22 of the present innovation allows the customer 12 performing the electronic payment transaction to effectuate the payment to the organization 10 on any particular day and applies the payment to the customer 12 on the particular day on a real-time basis and regardless of the time of day that the transaction is performed.

In such a system 22 of the present innovation, and still referring to FIG. 2, a payment transaction does not create a batch item 18 to be aggregated into a batch 20 which is processed at a later time. Instead, the system 22 of the present innovation immediately performs the debiting of the funds for the payment from the account 16 of the customer 12 by way of an appropriate interface to such account 16. Such an interface and such debiting are known or should be apparent to the relevant public, and therefore need not be set forth herein in any detail other than that which is provided.

Once an acknowledgement is received by the system 22 of the present innovation that the debiting has succeeded, the system 22 then immediately performs the crediting of the funds for the payment to an appropriate account of the organization 10. Presumably, an acknowledgement that the crediting has succeeded is received, and the system 22 of the present innovation applies the payment to the customer 12. Note here that such applying of the payment to the customer 12 occurs in a matter of seconds during the course of the electronic payment transaction and not at some time in the evening that day or the next day, and is therefore performed in real-time. As a result, with the system 22 of the present innovation, the customer 12 can be secure in the knowledge that the payment is applied when the transaction is performed.

Figure 3:
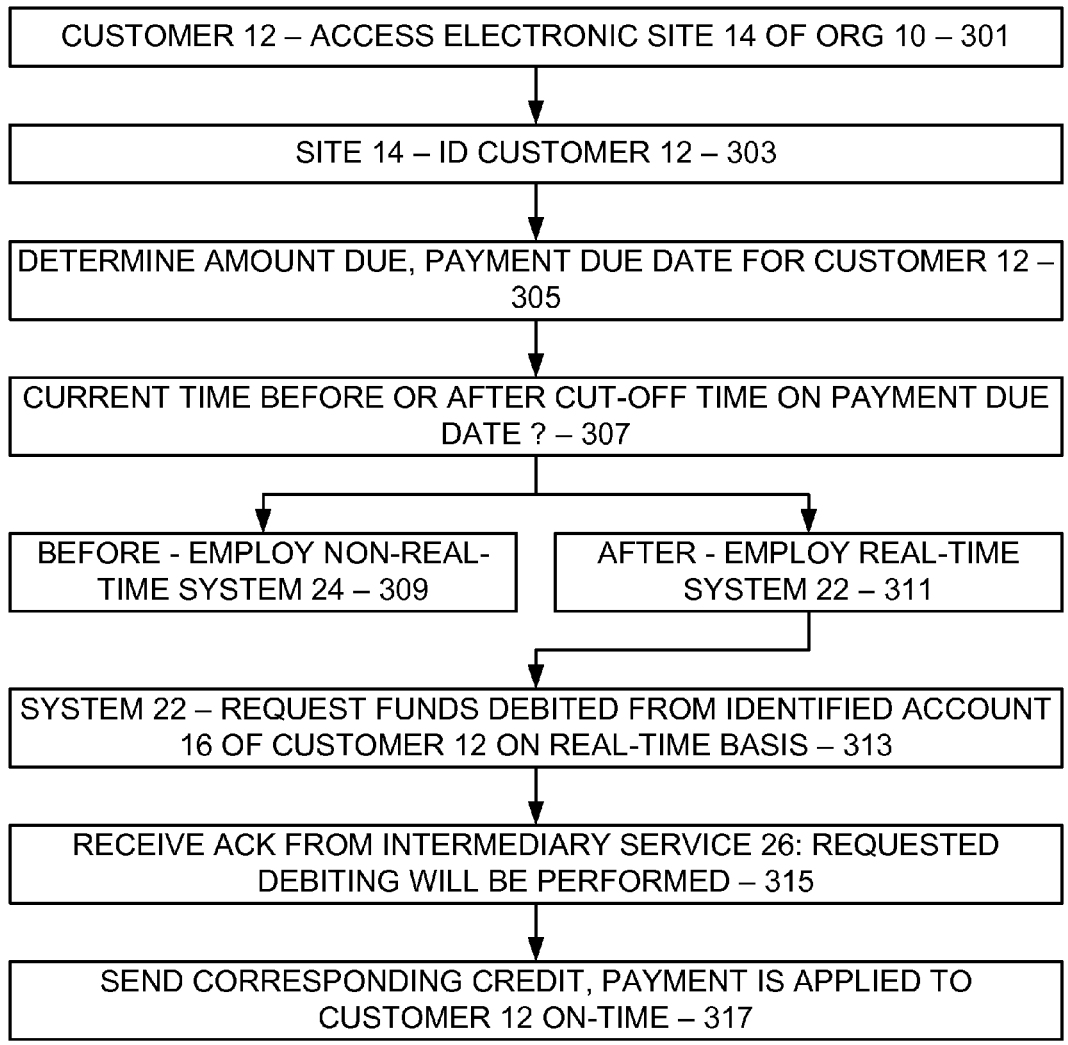
FIG. 3 is a flow diagram showing key actions performed in connection with the systems of FIG. 2 in accordance with various embodiments of the present innovation.

Turning now to FIG. 3, the processing performed by the system 22 of the present innovation is set forth in more detail. Preliminarily, and as should be understood, a customer 12 wishing to perform an electronic payment transaction with the organization 10 accesses the electronic site 14 of the organization 10 and commences such transaction (301). Note that accessing such site 14 may require some navigation among other sites of the organization 10 or the like, and may also require logging in with an appropriate user name and password or the like. Notably, in doing so, the customer 12 is identified at the site 14 (303) and the organization 10 can then determine information relating to the customer 12, including an amount due, a payment due date, and the like (305), either by accessing such information from a database or by having the customer manually enter same at the site 14.

Note here that if the current time is before the cut-off time on the payment due date (307), the organization 10 may wish to avoid use of the system 22 of the present innovation by the customer 12. Instead, the organization 10 may have the customer 12 employ a system 24 such as that of the prior art, as was set forth above, to effectuate the transaction for the customer 12 (309). As should be understood, the deficiency of such system 24 of the prior art arises only if the transaction is performed after the cut-off time. Otherwise, such system 24 is currently believed to be satisfactory, and therefore may be employed in circumstances where the cut-off time on the payment due date is not at issue. Moreover, and as may be appreciated, the cost of each transaction as performed by the system 22 of the present innovation on a real-time basis is likely significantly higher than as performed by the system 24 on a delayed basis according to batches 20 of batch items 18. As a result, employing the system 24 of the prior art on the delayed basis is likely preferable to employing the system 22 of the present innovation on the real-time basis, especially if the current time is before the cut-off time on the payment due date.

Assuming however, that the current time is after the cut-off time on the payment due date, or that time is of the essence for any other reason, the organization 10 may have the customer employ the system 22 of the present innovation to effectuate the transaction for the customer 12 (311). Here, the customer 12 identifies to the system 22 of the present innovation an account 16 of such customer 12 from which funds for the payment may be debited, and the system 22 requests that such identified account 16 be accessed and that such funds be electronically debited from such accessed account 16 on a real-time basis (313). Typically, although not necessarily, such electronic accessing and debiting are performed by way of an intermediary service 26, as is generally known. For example, Financial Transaction Services LLC of Beachwood, Ohio is one such intermediary service 26 that can perform such electronic accessing and debiting on a real-time basis.

Note here that electronically debiting the funds from the accessed account 16 on a real-time basis does not necessarily require that the funds in fact are removed from the account 16 immediately. Instead, accessing and debiting on a real-time basis only requires that an acknowledgement of the request be received from the intermediary service 26 and at the system 22 of the present innovation, where the acknowledgement from the intermediary service 26 shows that the accessing and debiting will be performed (315).

Once such an acknowledgment is received to show that the accessing and debiting of the funds from the account 16 of the customer 12 will be performed, the system 24 of the present innovation then electronically sends a corresponding credit to an account of the organization and in doing so the payment is in fact applied to the customer 12 (317). Thus, the payment is on-time even though the transaction may be conducted after the cut-off time on the payment due date.

As should be appreciated, the actual accessing and debiting of the funds from the account 16 are likely performed by the intermediary service 26 at some later point in time by way of a batch process similar to the batch process employed by the system 22 of the prior art. As should also be appreciated, the acknowledgement is sufficient to assume that the actual accessing and debiting will occur, even though there is a small risk that the accessing and debiting will fail, perhaps due to insufficient funds in the account 16.

Such a risk is manageable, however, and can be mitigated by restricting the system 24 of the present innovation to use by customers 12 in good standing, with good histories, with good creditworthiness, etc. Moreover, such a risk can be mitigated further by employing an intermediary service 26 that is particularly trusted to minimize such risk. Nevertheless, until the funds are received from the account 16 of the customer 12, the system 24 of the present innovation incurs the aforementioned risk.

In at least some circumstances, the account 16 of the customer 12 from which funds are to be debited is an account 16 maintained by the organization 10 on behalf of the customer 12. For example, the organization 10 may be a bank through which the customer 12 has a banking account, or may be a credit card company that issued a credit card to the customer 12. In such a case, the intermediary service 26 is likely not necessary, and the system 24 of the present innovation may instead immediately debit the funds from such an account 16. As a result, the risk that the debit will fail is minimized if not eliminated.

As set forth above, the decision whether to employ the system 24 of the prior art or the system 22 of the present innovation is based on whether the current time is before or after the cut-off time on the payment due date, as at 307. That said, other distinguishing bases may be employed without departing from the spirit and scope of the present innovation. As one example, and as was set forth above, a customer 12 may not be allowed to employ the system 22 of the present innovation if the risk incurred with regard to the customer 12 is too great. As another example, a different time may be employed. As another example, the cut-off time on the day before the payment due date may be employed, especially if any concerns exist that the cut-off time on the payment due date may still allow for the payment being applied to the customer 12 after the payment due date, or that an extra margin of error is required. As yet another example, 30 minutes before the cut-off time on the payment due date may be employed, especially if any concerns exist that the customer 12 may linger after the decision is made to employ the system 24 of the prior art, and such lingering may carry past the cut-off time.

Thus far, the various embodiments of the present innovation have been set forth in terms of a customer 12 making a payment to the organization 10. However, the customer may instead be making a payment to a third party by way of the organization without departing from the spirit and scope of the present innovation. In such an instance, the organization 10 could be acting as an agent of the third party. Note here that the organization 10 could be acting as an agent of multiple third parties to accept payments on behalf of each third party. In such a case, the organization 10 may be operating an electronic bill pay system service such as may be provided by a bank or other financial institution or the like.

CONCLUSION

The programming believed necessary to effectuate the processes performed in connection with the various embodiments of the present innovation is relatively straight-forward and should be apparent to the relevant programming public. Accordingly, such programming is not attached hereto. Any particular programming, then, may be employed to effectuate the various embodiments of the present innovation without departing from the spirit and scope thereof.

In the present innovation, systems and methods are provided for allowing an organization 10 to conduct real-time application of electronic payments from customers 12 so that funds from a payment transaction with a customer 12 are applied to the customer 12 on the date of the payment transaction. The organization 10 can conduct both real-time application of an electronic payment from a customer 12 who is conducting a payment transaction on the day payment is due, and also non-real-time application of an electronic payment from a customer 12 who is conducting a payment transaction prior to the day payment is due.

It should be appreciated that changes could be made to the embodiments described above without departing from the innovative concepts thereof. For example although the various embodiments of the present innovation are primarily set forth above in terms of an intermediary service 26, such intermediary service 26 may be omitted if the system 24 or a related system of the organization 10 is capable of performing the functionality of the intermediary service 26. It should be understood, therefore, that this innovation is not limited to the particular embodiments disclosed, but it is intended to cover modifications within the spirit and scope of the present innovation as defined by the appended claims.

The invention claimed is:

1. A method employed by an organization to electronically receive a payment from a customer of the organization, the organization operating a networked electronic payment site, the method comprising:

receiving and identifying the customer at the electronic payment site by way of a computing device;

identifying at the computing device by way of a computer database an amount due as a payment from the identified customer and a payment due date for the payment;

receiving from the identified customer at the electronic payment site an identification of an account of the customer from which funds for the payment are to be debited;

determining at the computing device a current time; and performing one of:

determining that the determined current time is before a predetermined time relating to the identified payment due date, and based thereon:

effectuating the payment from the customer by way of a non-real-time payment system implemented in computer hardware, including the non-real-time payment system processing the payment at a later time on or before the identified payment due date such that the payment is applied to the customer on or before the identified payment due date; and determining that the determined current time is after a predetermined time relating to the identified payment due date, and based thereon:

effectuating the payment from the customer by way of a real-time payment system implemented in computer hardware, including the real-time payment system processing the payment at the current time such that the payment is applied to the customer at the current time by:

requesting debiting the funds from the account, the debiting to be performed at a later time after the current time:

receiving an acknowledgment in a response to the request;

applying the payment based on the received acknowledgment, the received acknowledgment being sufficient to assume that the debiting will occur despite a risk that the debiting will not occur.

2. The method of claim 1 wherein the organization receives the payment for one of the organization and a third party.

3. The method of claim 1 wherein the non-real-time payment system:
   creates a batch item requesting electronic debiting of the funds for the payment from the identified account of the customer;
   aggregates the created batch item with other batch items requesting electronic debiting of funds from accounts of other customers into a batch; and
   processes the batch with the batch items at the later time on or before the identified payment due date such that the payment is applied to the customer on or before the identified payment due date.

4. The method of claim 1 wherein the non-real-time payment system:
   creates a batch item requesting electronic debiting of the funds for the payment from the identified account of the customer;
   aggregates the created batch item with other batch items requesting electronic debiting of funds from accounts of other customers into a batch; and
   processes the batch with the batch items at the later time on or before the identified payment due date such that the payment is applied to the customer on or before the identified payment due date, and
   wherein the predetermined time relating to the identified payment due date is a time relating to a cut-off time on the identified payment due date, wherein the batch item corresponding to the customer is aggregated by the non-real-time payment system into a batch processed on the identified payment due date if created before the cut-off time on the identified payment due date such that the payment is applied to the customer on the identified payment due date, and wherein the batch item corresponding to the customer is aggregated by the non-real-time payment system into a batch processed a next day after the identified payment due date if created after the cut-off time on the identified payment due date such that the payment is applied to the customer the next day after the identified payment due date.

5. The method of claim 1 wherein the real-time payment system processing the payment at the current time:
   requests electronic debiting of the funds for the payment from the identified account of the customer on a real-time basis;
   receives an acknowledgment based on the request that the debiting will be performed; and
   upon receiving the acknowledgment, credits the funds such that the payment is applied to the customer at the current time.

6. The method of claim 1 wherein the risk is mitigated by allowing use of the real-time payment system for the customer only if in good standing with the organization.

7. The method of claim 1 wherein the identified account of the customer is an account maintained by the organization on behalf of the customer.

8. A computer-readable storage medium having computer-executable instructions thereon implementing a method employed by an organization to electronically receive a payment from a customer of the organization, the organization operating a networked electronic payment site, the method comprising:
   receiving and identifying the customer at the electronic payment site;
   identifying an amount due as a payment from the identified customer and a payment due date for the payment;
   receiving from the identified customer at the electronic payment site an identification of an account of the customer from which funds for the payment are to be debited;
   determining a current time; and
   performing one of:
      determining that the determined current time is before a predetermined time relating to the identified payment due date, and based thereon:
      effectuating the payment from the customer by way of a non-real-time payment system, including the non-real-time payment system processing the payment at a later time on or before the identified payment due date such that the payment is applied to the customer on or before the identified payment due date; and
      determining that the determined current time is after a predetermined time relating to the identified payment due date, and based thereon:
      effectuating the payment from the customer by way of a real-time payment system, including the real-time payment system processing the payment at the current time such that the payment is applied to the customer at the current time by:
         requesting debiting the funds from the account, the debiting to be performed at a later time after the current time
         receiving an acknowledgment in a response to the request;
         applying the payment based on the received acknowledgment, the received acknowledgment being sufficient to assume that the debiting will occur despite a risk that the debiting will not occur.

9. The medium of claim 8 wherein the organization receives the payment for one of the organization and a third party.

10. The medium of claim 8 wherein the non-real-time payment system:
   creates a batch item requesting electronic debiting of the funds for the payment from the identified account of the customer;
   aggregates the created batch item with other batch items requesting electronic debiting of funds from accounts of other customers into a batch; and
   processes the batch with the batch items at the later time on or before the identified payment due date such that the payment is applied to the customer on or before the identified payment due date.

11. The medium of claim 8 wherein the non-real-time payment system:
   creates a batch item requesting electronic debiting of the funds for the payment from the identified account of the customer;
   aggregates the created batch item with other batch items requesting electronic debiting of funds from accounts of other customers into a batch; and
   processes the batch with the batch items at the later time on or before the identified payment due date such that the payment is applied to the customer on or before the identified payment due date, and
   wherein the predetermined time relating to the identified payment due date is a time relating to a cut-off time on the identified payment due date, wherein the batch item corresponding to the customer is aggregated by the non-real-time payment system into a batch processed on the identified payment due date if created before the cut-off time on the identified payment due date such that the payment is applied to the customer on the identified payment due date, and wherein the batch item corresponding to the customer is aggregated by the non-real-time payment system into a batch processed a next day after the identified payment due date if created after the cut-off time on the identified payment due date such that the payment is applied to the customer the next day after the identified payment due date.

12. The medium of claim 8 wherein the real-time payment system processing the payment at the current time:
   requests electronic debiting of the funds for the payment from the identified account of the customer on a real-time basis;
   receives an acknowledgment based on the request that the debiting will be performed; and
   upon receiving the acknowledgment, credits the funds such that the payment is applied to the customer at the current time.

13. The medium of claim 8 wherein the risk is mitigated by allowing use of the real-time payment system for the customer only if in good standing with the organization.

14. The medium of claim 8 wherein the identified account of the customer is an account maintained by the organization on behalf of the customer.

15. A hardware system employed by an organization to electronically receive a payment from a customer of the organization, the organization operating a networked electronic payment site, the system comprising:
   a computing device that receives and identifies the customer at the electronic payment site;
   a computer database from which the computing device identifies an amount due as a payment from the identified customer and a payment due date for the payment;
   a sub-system that receives from the identified customer at the electronic payment site an identification of an account of the customer from which funds for the payment are to be debited;
   a sub-system that determines at the computing device a current time;
   a non-real-time payment system implemented in computer hardware and effectuating the payment from the customer when the determined current time is before a predetermined time relating to the identified payment due date, the non-real-time payment system processing the payment at a later time on or before the identified payment due date such that the payment is applied to the customer on or before the identified payment due date; and
   a real-time payment system implemented in computer hardware and effectuating the payment from the customer when the determined current time is after a predetermined time relating to the identified payment due date, the real-time payment system processing the payment at the current time such that the payment is applied to the customer at the current time by:
      requesting debiting the funds from the account, the debiting to be performed at a later time after the current time:
      receiving an acknowledgment in a response to the request;
      applying the payment based on the received acknowledgment, the received acknowledgment being sufficient to assume that the debiting will occur despite a risk that the debiting will not occur.

16. The system of claim 15 wherein the organization receives the payment for one of the organization and a third party.

17. The system of claim 15 wherein the non-real-time payment system includes:
   a sub-system that creates a batch item requesting electronic debiting of the funds for the payment from the identified account of the customer;
   a sub-system that aggregates the created batch item with other batch items requesting electronic debiting of funds from accounts of other customers into a batch; and
   a sub-system that processes the batch with the batch items at the later time on or before the identified payment due date such that the payment is applied to the customer on or before the identified payment due date.

18. The system of claim 15 wherein the non-real-time payment system includes:
   a sub-system that creates a batch item requesting electronic debiting of the funds for the payment from the identified account of the customer;
   a sub-system that aggregates the created batch item with other batch items requesting electronic debiting of funds from accounts of other customers into a batch; and
   a sub-system that processes the batch with the batch items at the later time on or before the identified payment due date such that the payment is applied to the customer on or before the identified payment due date, and
   wherein the predetermined time relating to the identified payment due date is a time relating to a cut-off time on the identified payment due date, wherein the batch item corresponding to the customer is aggregated by the non-real-time payment system into a batch processed on the identified payment due date if created before the cut-off time on the identified payment due date such that the payment is applied to the customer on the identified payment due date, and wherein the batch item corresponding to the customer is aggregated by the non-real-time payment system into a batch processed a next day after the identified payment due date if created after the cut-off time on the identified payment due date such that the payment is applied to the customer the next day after the identified payment due date.

19. The system of claim 15 wherein the real-time payment system processing the payment at the current time includes:
   a sub-system that requests electronic debiting of the funds for the payment from the identified account of the customer on a real-time basis;
   a sub-system that receives an acknowledgment based on the request that the debiting will be performed; and
   a sub-system that upon receiving the acknowledgment, credits the funds such that the payment is applied to the customer at the current time.

20. The system of claim 15 wherein the risk is mitigated by allowing use of the real-time payment system for the customer only if in good standing with the organization.

21. The system of claim 15 wherein the identified account of the customer is an account maintained by the organization on behalf of the customer.

* * * * *